US 7,783,472 B2

(12) United States Patent
Nagao et al.

(10) Patent No.: US 7,783,472 B2
(45) Date of Patent: Aug. 24, 2010

(54) DOCUMENT TRANSLATION METHOD AND DOCUMENT TRANSLATION DEVICE

(75) Inventors: Takashi Nagao, Ashigarakami-gun (JP); Masakazu Tateno, Ashigarakami-gun (JP); Kei Tanaka, Ashigarakami-gun (JP); Kotaro Nakamura, Minato-ku (JP); Masayoshi Sakakibara, Ebina (JP); Xinyu Peng, Ebina (JP); Teruka Saito, Ashigarakami-gun (JP); Toshiya Koyama, Ashigarakami-gun (JP)

(73) Assignee: Fuji Xerox Co., Ltd, Tokyo (JP)

( * ) Notice: Subject to any disclaimer, the term of this patent is extended or adjusted under 35 U.S.C. 154(b) by 928 days.

(21) Appl. No.: 11/197,328

(22) Filed: Aug. 5, 2005

(65) Prior Publication Data

US 2006/0217955 A1    Sep. 28, 2006

(30) Foreign Application Priority Data

Mar. 28, 2005    (JP)    ............................. 2005-092622

(51) Int. Cl.
G06F 17/28    (2006.01)
(52) U.S. Cl. .................. 704/2; 704/4; 704/5; 704/7
(58) Field of Classification Search ................ 704/2, 704/4, 5, 7
See application file for complete search history.

(56) References Cited

U.S. PATENT DOCUMENTS

| | | | | |
|---|---|---|---|---|
| 4,597,055 A | * | 6/1986 | Hashimoto et al. ............. | 704/5 |
| 4,774,666 A | * | 9/1988 | Miyao et al. ................... | 704/2 |
| 4,791,587 A | * | 12/1988 | Doi ............................... | 704/2 |
| 5,010,486 A | * | 4/1991 | Suzuki et al. .................. | 704/5 |
| 5,289,375 A | * | 2/1994 | Fukumochi et al. ............ | 704/2 |
| 5,303,151 A | * | 4/1994 | Neumann ....................... | 704/2 |
| 5,497,319 A | * | 3/1996 | Chong et al. ................... | 704/2 |
| 5,510,981 A | * | 4/1996 | Berger et al. .................. | 704/2 |
| 5,587,902 A | * | 12/1996 | Kugimiya ....................... | 704/2 |
| 5,692,073 A | * | 11/1997 | Cass ............................. | 382/219 |
| 5,748,805 A | * | 5/1998 | Withgott et al. ............. | 382/306 |
| 5,761,681 A | * | 6/1998 | Huffman et al. ............ | 715/210 |
| 5,848,386 A | * | 12/1998 | Motoyama ..................... | 704/5 |
| 5,873,055 A | * | 2/1999 | Okunishi ....................... | 704/2 |
| 5,903,858 A | * | 5/1999 | Saraki ........................... | 704/4 |

(Continued)

FOREIGN PATENT DOCUMENTS

JP    1 62-154845    7/1987

OTHER PUBLICATIONS

Carl,M.: 1999, 'Inducing Translation Templates for Example-Based Machine Translation', Machine Translation Summit VII, Singapore.*

(Continued)

*Primary Examiner*—Talivaldis Ivars Smits
*Assistant Examiner*—Greg A Borsetti
(74) *Attorney, Agent, or Firm*—Oliff & Berridge, PLC

(57)    ABSTRACT

A document translation method having extracting a term from a document, executing a substitute process and outputting the term in a predetermined manner. The process of executing a substitute process on the term is performed in a translating process when the term from the document matches a term predetermined by a user. The substitute process is corresponding to the term and predetermined by the user.

15 Claims, 4 Drawing Sheets

U.S. PATENT DOCUMENTS

| | | | |
|---|---|---|---|
| 6,006,221 A * | 12/1999 | Liddy et al. | 707/5 |
| 6,047,299 A * | 4/2000 | Kaijima | 715/236 |
| 6,119,077 A * | 9/2000 | Shinozaki | 704/3 |
| 6,163,785 A * | 12/2000 | Carbonell et al. | 715/530 |
| 6,269,189 B1 * | 7/2001 | Chanod | 382/229 |
| 6,292,772 B1 * | 9/2001 | Kantrowitz | 704/9 |
| 6,385,568 B1 * | 5/2002 | Brandon et al. | 704/7 |
| 6,438,523 B1 * | 8/2002 | Oberteuffer et al. | 704/270 |
| 6,470,306 B1 * | 10/2002 | Pringle et al. | 704/3 |
| 6,647,364 B1 * | 11/2003 | Yumura et al. | 704/4 |
| 6,892,190 B2 * | 5/2005 | Hatori et al. | 706/12 |
| 6,900,819 B2 * | 5/2005 | Marshall et al. | 345/667 |
| 6,993,473 B2 * | 1/2006 | Cartus | 704/2 |
| 7,047,182 B2 * | 5/2006 | Masuichi | 704/7 |
| 7,310,605 B2 * | 12/2007 | Janakiraman et al. | 704/277 |
| 7,369,986 B2 * | 5/2008 | Janakiraman et al. | 704/8 |
| 2001/0012991 A1 * | 8/2001 | Kimpara et al. | 704/5 |
| 2003/0004702 A1 * | 1/2003 | Higinbotham | 704/2 |
| 2003/0009320 A1 * | 1/2003 | Furuta | 704/2 |
| 2003/0028367 A1 * | 2/2003 | Chalabi | 704/4 |
| 2003/0046062 A1 * | 3/2003 | Cartus | 704/10 |
| 2003/0070139 A1 * | 4/2003 | Marshall et al. | 715/512 |
| 2003/0083862 A1 * | 5/2003 | Hu et al. | 704/9 |
| 2003/0212544 A1 * | 11/2003 | Acero et al. | 704/9 |
| 2003/0229487 A1 * | 12/2003 | Wang | 704/4 |
| 2004/0167768 A1 * | 8/2004 | Travieso et al. | 704/2 |
| 2005/0071165 A1 * | 3/2005 | Hofstader et al. | 704/270.1 |
| 2006/0100849 A1 * | 5/2006 | Chan | 704/8 |
| 2007/0043552 A1 * | 2/2007 | Omi et al. | 704/2 |

OTHER PUBLICATIONS

Nagao, K., Shirai, Y., Squire, K. 2001. Semantic Annotation and Transcoding: Making Web Content More Accessible. IEEE.*

Wan, S. and C. M. Verspoor, 1998. Automatic English-Chinese name transliteration for development of multilingual resources. In Proceedings of COLINGACL' 98, the joint meeting of 17th International Conference on Computational Linguistics and the 36th Annual Meeting of the Association for Computational Linguistics, Montreal, Canada.*

Ogden et al., 1999a Ogden, W., Cowie, J., Davis, M., Ludovic, E., Nirenburg, S., Molina-Salgado, H., & Sharples, N. (1999a). Keizai: an interactive cross-language text retrieval system. In Proceeding of the MT Summit VII workshop on machine translation for cross language information retrieval.*

Fujii A Ishikawa T (2001) Japanese/English cross-language information retrieval: Exploration of query translation and transliteration. Computers and the Humanities, to appear.*

K. Nagao, S. Ohira, and M. Yoneoka, "Annotation-Based Multimedia Summarization and Translation," Proc. 19th Int'l Conf. Computational Linguistics, Morgan Kaufmann Pub., 2002, pp. 702-708.*

H. Sridharan, Y. Chen, H. Sundaram, et al. (2004). Integrating Paper Annotations with Electronic Environments, AME-TR-2004-13, Arts Media and Engineering, ASU, Dec. 2004.*

* cited by examiner

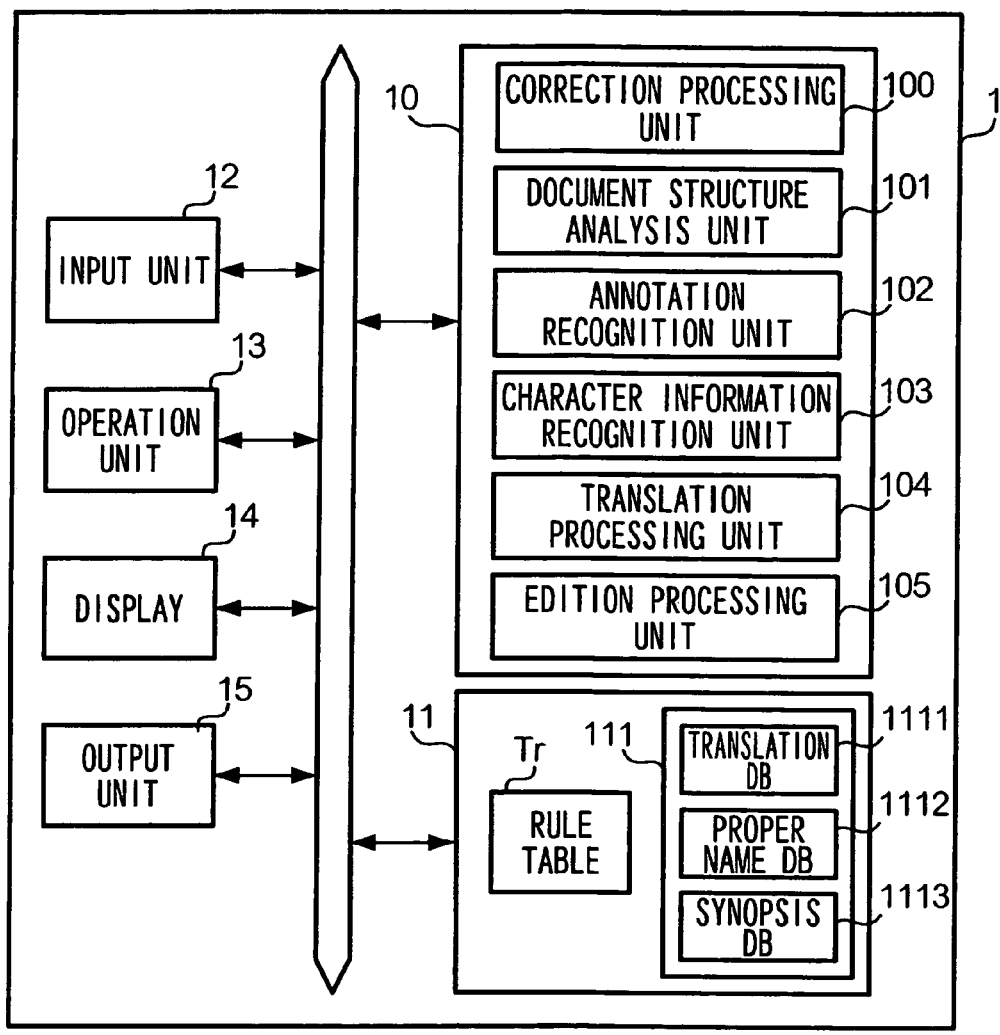

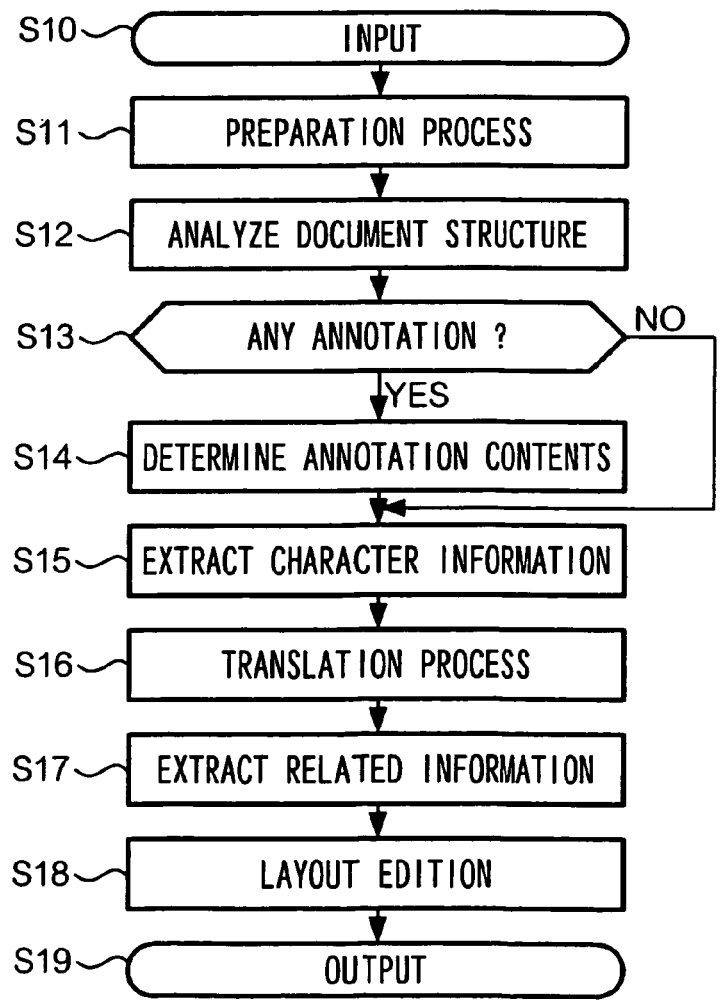

DOCUMENT TRANSLATION METHOD AND DOCUMENT TRANSLATION DEVICE

BACKGROUND OF THE INVENTION

1. Field of the Invention

The present invention relates to a method for improving the quality of machine translation.

2. Description of the Related Art

As a result of significant advances in global electronic communication, demand for machine translation from one language to another is increasing. A machine translation is performed by using a computer to replace character (term) with another character (term), by analyzing the characters and applying dictionary data or a predetermined algorithm to thereby translate from a specific language to a different language. If a text is not stored in a computer-readable format, in other words, if character information such as JIS code is not included in the text, prior to translation process, it is necessary to perform an OCR process for reading a printed text by a scanner device, to perform a character recognition process, and to extract character information.

One advantage of machine translation is that it is possible to translate a large document in a short time; a disadvantage is that the quality of the translated document is usually of a relatively low standard. One example of this disadvantage is that it is difficult in a machine translation to translate a proper noun. When a proper noun included in a tourist pamphlet, such as a place name, a station name, a personal name, or a company name, which must remain in its original form is translated, the translated text will not contain information that is critical for a reader. Also, a word which is essentially rooted in a particular culture can not be properly translated. A case frequently occurs wherein a person who is unfamiliar with the particular culture will not be able to interpret the essential meaning of the word. In other words, a conventional machine translation only allows a translation process to take place in a manner of direct translation wherein a simple substitution by a translation registered in the dictionary data is performed; thus, according to conventional translation, it is not possible to accurately make a determination as to whether the word to be translated is a proper noun, and whether the word is to remain in its original form without being translated. As the result of unsuitable translation, a user is required to check a document after a machine translation has been performed and to make corrections for every word, so identified. The task of performing a correction of a translated document places an added burden on a user and decreases the benefit gained from performing a high speed machine translation.

SUMMARY OF THE INVENTION

The present invention has been made in view of the above circumstances and provides a document processing method and a document processing device that provides a translated document of high quality, without placing a burden on a user and without decreasing a processing speed in translation.

To address the stated problems described above, the present invention provides a translation processing method. An embodiment of a document translation method has extracting a term from a document, executing a substitute process on the term in a translating process and outputting the term executed by the substitute process in a predetermined manner. The substitute process is executed on the term when the term from the document matches a term predetermined by a user. The substitute process is corresponding to the term and predetermined by the user.

BRIEF DESCRIPTION OF THE DRAWINGS

Embodiments of the present invention will be described in detail based on the figures, wherein:

FIG. 1 is a diagram showing the functional configuration of document translation device 1 according to one embodiment of the present invention;

FIG. 2 is a diagram explaining the storage contents of proper name DB 1112;

FIG. 3 is a diagram explaining the storage contents of synopsis DB 1113;

FIG. 4 is a diagram explaining the configuration of rule table Tr;

FIG. 5($b$) is a diagram explaining details of a translation process;

FIG. 5($c$) is a diagram explaining details of an extraction process of related information;

FIG. 6($b$) is a diagram illustrating the original text which is a translation object.

DETAILED DESCRIPTION OF THE INVENTION

Embodiments

Figure 5B:
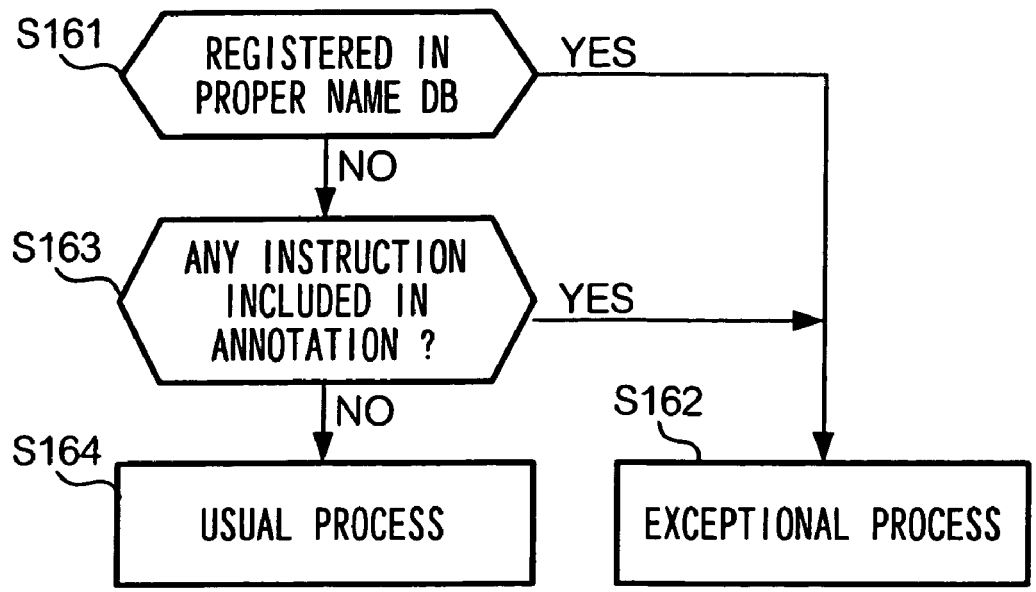
FIG. 5($a$) a diagram explaining the overall flow of the process performed in document translation device 1.

Referring to the drawings, embodiments of the present invention will be explained. FIG. 1 is a diagram showing the functional configuration of a document translation device 1 according to one embodiment of the present invention. As shown in the figure, document translation device 1 has a control unit 10, a memory 11, an input unit 12, an operation unit 13, a display 14, and an output unit 15. The control unit 10 has a processor for causing a CPU to control each unit in document translation device 1. The control unit 10 has a correction processing unit 100, a document structure analysis unit 101, an annotation recognition unit 102, a character information recognition unit 103, a translation processing unit 104, and an edition processing unit 105. The correction processing unit 100 performs various types of preparation on document image data read in the input unit 12. The preparation includes a distortion correction process such as angle correction or noise deletion; a gray conversion process performed when the read data is a color image; or a binarization process. The document structure analysis unit 101, using a predetermined algorithm, performs a layout analysis for image data and determines a layout structure of a document. Specifically, the document structure analysis unit 101 divides a document into a predetermined area and determines the type (character, figure, picture) of each area. Then, the document structure analysis unit 101 separates the text into line units and determines whether the text contain additional information (such as underlining, highlighting, a moving border, a leading line, or a note; hereinafter, referred to as annotation). If a text contains an annotation, the annotation is separated from the text.

The annotation recognition unit 102 performs a predetermined image analysis process and determines both the type of annotation and the object part (a text element such as a word or a phrase) to which an annotation is added, referring to the pattern data of annotation based on the data stored in the memory 11. The character information recognition unit 103 performs a predetermined analysis process for each line of the separated text, divides the text on a word basis, performs a character recognition process, and extracts character information (term). Specifically, the character information recognition unit 103 firstly identifies information on a character basis, identifies a word having a specific meaning formed by a group of characters, and identifies a term having a specific meaning (vocabulary) formed by a group of words. The translation processing unit 104 performs a substitution process for each sentence on a vocabulary (term) basis by referring to dictionary data stored in the memory 11 and sorts the substituted words by using a predetermined algorithm. Details of the process performed in the control unit 10 will be described below. The functions of each unit realized in the control unit 10 may be realized by independent processors, or realized by having a single processor using plural software. The edition processing unit 105 combines a translated text and the information extracted from a synopsis DB 1113 in a predetermined manner. In this way, the layout of a document is determined.

The memory 11 is a storage device such as a RAM, a ROM, and a hard-disk. The memory 11 stores a database (DB) 111 or other reference data required for performing the above process at the control unit 10. The DB 111 further comprises a translation DB 1111, a proper name DB 1112, and the synopsis DB 1113. The translation DB 1111 includes the above-described dictionary data, such as a general English-Japanese dictionary data or Japanese-English dictionary data. The proper name DB 1112 stores a proper noun such as "Kyoto" and the attribute of the word such as a "place name" in correspondence with its reading, as shown in FIG. 2. The synopsis DB 1113 stores a term in correspondence with its related information (a detailed meaning and related information of the term), as shown in FIG. 3. The memory 11 further stores a rule table Tr in which the contents (type) of an annotation and the contents of a translation process corresponding to the annotation are described.

The input unit 12 is such as a scanner device. The scanner device is for reading the document printed on paper as digital image data and provides the data to the control unit 10 and the memory 11. The operation unit 13 is an input device such as a keyboard or a mouse used by a user of the document translation device 1 for specifying the document to be translated, writing information in the rule table Tr, adding annotation (details of annotation will be described below), and inputting necessary information. Instructions or information inputted through the operation unit 13 are provided to the control unit 10. The display 14 comprises a processor dedicated for drawing (not shown) and a display device such as a liquid crystal display (not shown). The display 14 displays an original text, a translated document, and any type of messages for users based on an instruction from the control unit 10. A user refers to a display screen of the display 14 and inputs instructions through the input unit 12, so as to have the document translation device 1 perform various processes. The output unit 15 is a printer for printing an edited document on paper, a communication interface for providing document data acquired after performing additional information editing process to a printing device, or a storage device for storing document data in a storage medium such as a flash memory or a CD-ROM.

Figure 6A:
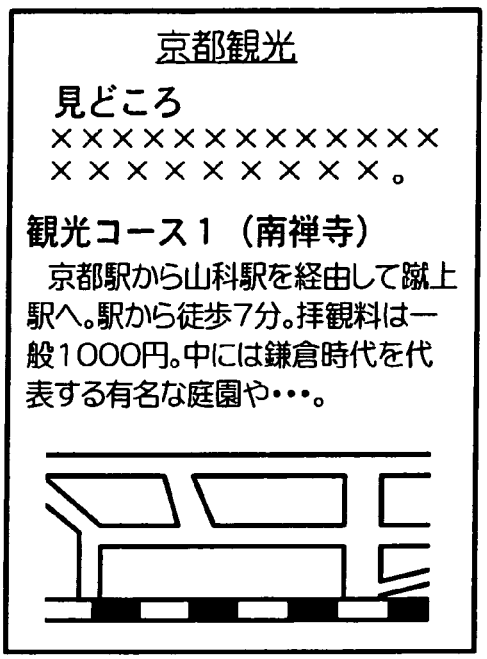
FIG. 6($a$) is a diagram illustrating the original text which is a translation object.
Figure 6B:
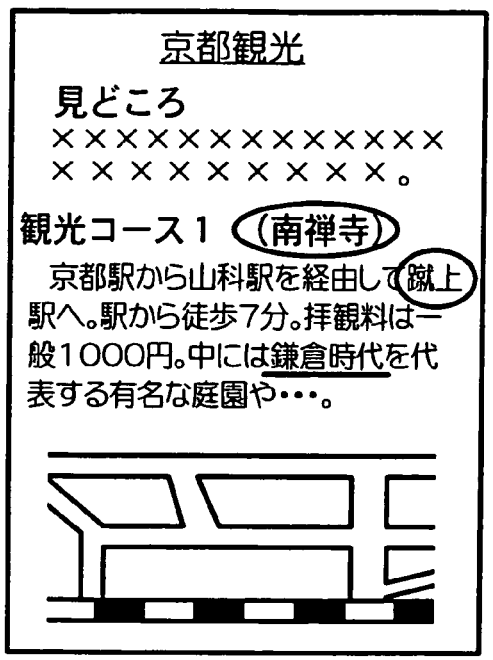
Figure 7A:
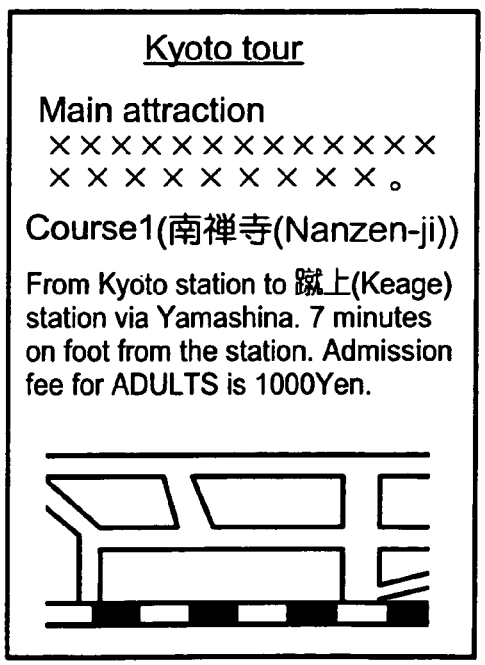
FIG. 7 is a diagram illustrating a translation process performed on a document.
Figure 7B:
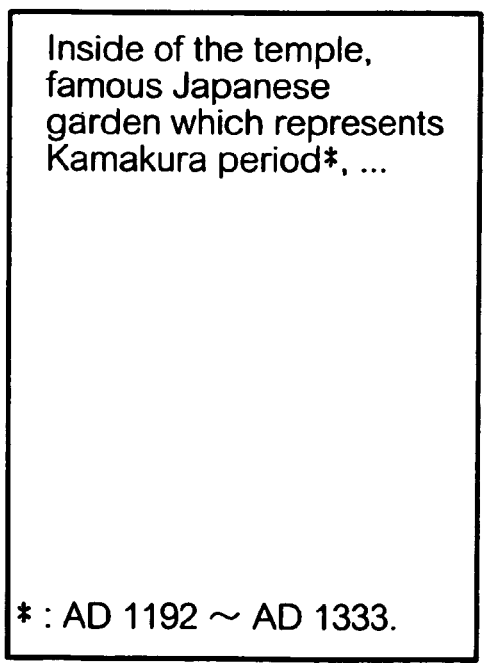

Referring to FIGS. 5 to 7, one example of an operation of the document translation device 1 will be explained. It is to be noted that, any necessary information are pre-stored in the DB 111 and in the rule table Tr shown in FIG. 2 to FIG. 4.

FIG. 5A is a diagram for explaining the overall flow of the process performed by the document translation device 1. As shown in the figure, a user inputs a predetermined instruction to specify both the original language and the type of language to be translated (hereinafter, referred to as target language), sets a document which the user wants to translate (hereinafter, such a document will be referred to as a translation object document) on a scanner device, and scans the document to acquire image data (step S10). In the following, an explanation will be given with respect to a case wherein Japanese text as shown in FIG. 6A or 6B are translated into English. Referring again to FIG. 5A, the control unit 10 performs a preprocessing on the acquired image data if necessary (step S11), performs analysis of document structure and extracts a sentence part on a line basis, along with separating and extracting annotations from the sentence part (step S12). If no annotation is extracted (step S13, N); namely, the original text does not contain any annotation as shown in FIG. 6 A, the process proceeds to step S15. On the contrary, if the original text contains annotations as shown in FIG. 6 B, the annotations are extracted (step S13, Y) and, by performing a pattern recognition of the annotations, the contents (the type of annotations, the area of a document image containing annotations and the area corresponding to characters, words, and terms) of each extracted annotation are determined (step S14).

The control unit 10 then divides the lines containing characters on a character basis to perform a character recognition process, extracts character information (term) (step S15), and performs the translation process on the character information using dictionary data stored in the translation DB 1111 (step S16). When performing the translation process on the term satisfying specific conditions, the control unit 10 performs an unusual process (hereinafter, the process will be referred to as an exceptional process) instead of substituting the term with a regular translation registered in the dictionary data (hereinafter, the process will be referred to as a regular process). The details of the translation process will be explained with reference to FIG. 5 B. The translation processing unit 104, by referring to the proper name DB 1112, determines whether each character information (term) extracted at step S15 matches a proper noun registered in the proper name DB (step S161). When a term that matches the term registered in the proper name DB is identified in the original text (such as "Kyoto", step S161,Y"), the exceptional process is performed on the term (step S162). Specifically, the original term is not translated and the reading of the term is added next to the term in brackets. For example, in the case of ""京都",", the word is substituted to ""京都 (Kyoto)" instead of substituting to "Kyoto". For the term that do not match the term registered in the proper name DB (step S161, "N"), a determination is made as to whether the term is prohibited from being translated by an annotation (step S163). Specifically, the control unit 10 determines whether an annotation aimed at the term exists; when an annotation exists (step S163, Y), the control unit 10 identifies the type of the annotation. Then, the control unit 10 uses the rule table Tr to determine the contents of the translation process corresponding to the annotation. If the contents of the translation process indicate that the "original term is to be used and the reading of the term is to be added", the above-described exceptional process is performed on the term (step S162). When the annotation added to the term is not the type that specifies the above-described exceptional process (step S163, N), a regular translation process is performed on the term (step S164).

Figure 5C:
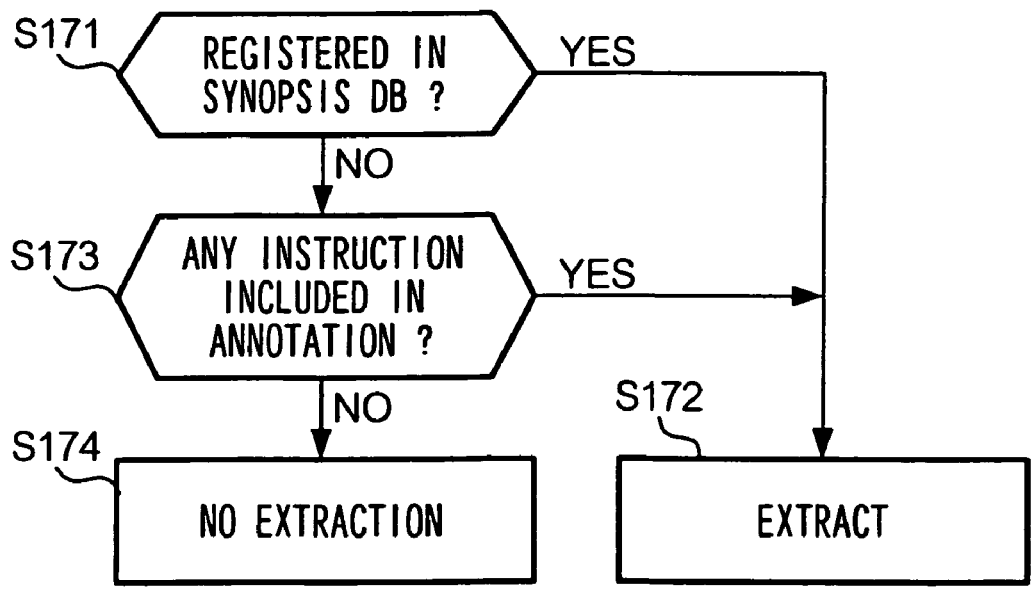

Referring again to FIG. 5A, when the determination for each term as to whether the term is subjected to either the usual process or the exceptional process is made, the control unit 10 determines whether any related information is to be added to each term (step S17). Specifically, as shown in FIG. 5C, the control unit 10 refers to the synopsis DB 1113 for each term to determine whether the term match the proper noun registered in the synopsis DB 1113 (step S171). When the term that matches the term registered in the synopsis DB ("Kamakura era", for example) (step S171. Y), the control unit 10 extracts the related information corresponding to the term from the synopsis DB 1113 (step S172). When the term does not match the term registered in the synopsis DB (step S171. N), the control unit determines whether the extraction of corresponding related information is instructed by an annotation (step S173). Specifically, the control unit 10 determines whether an annotation for the term exists; when an annotation exists, the control unit 10 determines the type of the annotation. The control unit 10 then determines the contents of the translation process corresponding to the annotation by using the rule table Tr. In a case that the contents of the translation process indicate "add related information to the blank", the control unit extracts related information for the term (step S172). In a case that the annotation added to the term is not an annotation specifying the above-described exceptional process (step S173, N), the control unit 10 does not extract the related information for the term (step S174).

Referring again to FIG. 5A, when a determination is made as to whether related information is to be extracted, the control unit 10 performs a layout edition (step S18). Namely, the location of each element is determined on the basis of the input text image data, the result of document analysis structure, the result of the translation process, and the contents of the related information if the related information is extracted from the synopsis DB 1113; also, the information of the placement location if the placement location of the related information is specified. The control unit 10 outputs a text prepared in accordance with the layout (step S19). FIG. 7 shows one example of an output text. In the example shown in the figure, the translated text with an exceptional process performed are placed by keeping the original layout as much as possible; also, a mark "*" indicating that the text is an extracted related information and the contents of the related information "AD1192~AD1333" of the original text is added to the margin at the end of the specified page. Furthermore, next to the term "Kamakura era" which is a translation of " "鎌倉時代",", the mark of "*" indicating that related information of the translation exists is added.

Thus, with the document translation device 1, by registering terms to which an exceptional process must be performed, such as a proper noun in the translation DB 1111, the translated text will not have an unsuitable meaning. Also, by registering a term that is rooted in a particular culture and which are difficult for a reader to interpret whether in their original form or in translation, related information such as an explanation of the terms is output along with the translated text, making comprehension easier for a user. Also, the specification of either an exceptional process or the extraction of related information is realized by adding annotation to an original text. In such a configuration, it is possible to specify the contents of the translation process according to a preference of a user, and the contents of a translation process that can be specified may be changed by changing the type of annotation to be added.

The present invention is not limited thereto, and is open to various modifications. For example, a determination as to whether an exceptional process is to be performed and whether related information is to be extracted is not limited to the embodiments described above. In one embodiment, for example, it is not necessary to perform an exceptional process on all of the terms that match terms stored in the proper name DB 1112; it is also possible to perform an exceptional process on a term having a specific attribute. Furthermore, in the above-described exceptional process, what is located next to the term of the original text is not limited to a bracket; a ruby may also be added. Furthermore, the reading of a term may be added in the margin or as a footnote after assigning a corresponding number to the term.

To address the stated problems described above, the present invention provides a extracting a term from a document; executing a substitute process on the term in a translating process when the term from the document matches a term predetermined by a user, the substitute process being corresponding to the term and predetermined by the user; and outputting in a predetermined manner the term executed by the substitute process. According to an embodiment of the present invention, a translation of the pre-registered proper noun is not prohibited; thus, it is possible to prevent the occurrence of unsuitable translation without placing a burden on a user.

In an embodiment, the substitute process has a process for outputting the term in an original language and a process for outputting the term in a target language to be translated at a predetermined location. In another embodiment, the document translation method comprising: editing the term executed by the substitute process and related information, the related information being related to the term; and outputting the edited term and the relation information in a predetermined manner. In this embodiment, related information is provided for a term that is essentially difficult to translate; thus, the embodiment facilitates interpretation of a translated document by a user.

In another embodiment, the document translation method having: extracting a term and an annotation from a document, the term being marked by the annotation; executing a substitute process on the term in a translating process, the substitute process being corresponding to the annotation; and outputting in a predetermined manner the term executed by the substitute process. In this embodiment, it is possible to set the contents of a translation process according to a user's preference.

In another point of view, the present invention provides a document translation device having: an extracting unit that extracts a term from a document; an executing unit that executes a substitute process on the term in a translating process when the term from the document matches a term predetermined by a user, the substitute process being corresponding to the term and predetermined by the user, and an outputting unit that outputs in a predetermined manner the term executed by the substitute process.

In an embodiment, a document translation device having: an extracting unit that extracts a term and an annotation from a document, the term being marked by the annotation; an executing unit that executes a substitute process on the term in a translating process, the substitute process being corresponding to the annotation; and an outputting unit that outputs in a predetermined manner the term executed by the substitute process.

The present invention, in another embodiment, provides a computer readable program that enables a computer to perform the above-described process.

The entire disclosure of Japanese Patent Application No. 2005-92622 filed on Mar. 28, 2005 including specification, claims, drawings and abstract is incorporated herein by reference in its entirety.

What is claimed is:

1. A document translation method performed by a control unit having a processor to achieve translation on a document-by-document basis, comprising:
    extracting all at once at least one original term and a corresponding visual annotation from a document, using the processor, each said original term being visually marked by a user to form the corresponding annotation;
    determining whether the original term matches a proper noun;

identifying a type of annotation from among a plurality of different types;

identifying a specific translation process to be executed on each said determined proper noun based on the identified type of annotation, a first specific translation process being executed for a first identified type of annotation, and a second, different translation process being executed for a second, different annotation type;

executing, using the processor, the specific translation process on each said original term based on the identified type of annotation; and outputting in a predetermined manner each said translated original term executed by the translation process to at least one of a computer-readable storage medium, a display screen, and a printer, wherein an original term that does not match a proper noun is translated to include a target language translation of the original term.

2. The document translation method according to claim 1, wherein the translation process has a process for outputting each said original term in an original language and a process for outputting a target language translation of each said original term at a predetermined location relative to each said original term.

3. The document translation method according to claim 1, further comprising:

determining whether related information related to each said original term is available; and outputting the translated term appended with the related information depending on the type of annotation identified.

4. The document translation method according to claim 1, wherein the different types of annotation include at least two annotations selected from the group of highlight, underline, moving border, leading line and note.

5. The document translation method according to claim 4, wherein an original term that does match a proper noun and has a corresponding first type annotation is translated by a first specific translation process that outputs each original term in an original language and outputs a target language translation of each said original term at a predetermined location relative to each said original term, and an original term that does match a proper noun and has a corresponding second, different type annotation is translated by a second specific translation process that outputs a target language translation of each said original term appended with related information related to each said original term.

6. A document translation device that achieves translation on a document-by-document basis comprising:

an extracting unit that extracts all at once at least one original term and a corresponding visual annotation from a document, each said original term being visually marked by a user to form the corresponding annotation;

a translating processing unit that determines whether the original term matches a proper noun, identifies a type of the annotation from among a plurality of different types, and identifies a specific translation process to be executed on each said determined proper noun based on the identified type of annotation, a first specific translation process being executed for a first identified type of annotation, and a second, different translation process being executed for a second, different annotation type;

an executing unit that executes the specific translation process on each said original term based on the identified type of annotation; and an outputting unit that outputs in a predetermined manner each translated original term executed by the translation process to at least one of a computer-readable storage medium, a display screen, and a printer, wherein an original term that does not match a proper noun is translated to include a target language translation of the original term.

7. The document translation device according to claim 6, wherein the translation process has a process for outputting each said original term in an original language and a process for outputting a target language translation of each said original term at a predetermined location relative to each said original term.

8. The document translation device according to claim 6, further comprising:

an annotation processing unit that determines whether related information related to each said original term is available; and the outputting unit outputs the translation of each said original term and the related information in a predetermined manner.

9. The document translation device according to claim 6, wherein the different types of annotation include at least two annotations selected from the group of highlight, underline, moving border, leading line and note.

10. The document translation device according to claim 6, wherein an original term that does match a proper noun and has a corresponding first type annotation is translated by a first specific translation process that outputs each original term in an original language and outputs a target language translation of each said original term at a predetermined location relative to each said original term, and an original term that does match a proper noun and has a corresponding second, different type annotation is translated by a second specific translation process that outputs a target language translation of each said original term appended with related information related to each said original term.

11. A non-transitory storage medium readable by a computer, the storage medium storing a program of instructions executable by the computer to perform a function for document translation to achieve translation on a document-by-document basis, the function comprising:

extracting all at once at least one original term and a corresponding visual annotation from a document, each said original term being visually marked by a user to form the corresponding annotation;

determining whether the original term matches a proper noun;

identifying a type of annotation from among a plurality of different types;

identifying a specific translation process to be executed on each said proper noun based on the identified type of annotation, a first specific translation process being executed for a first identified type of annotation, and a second, different translation process being executed for a second, different annotation type;

executing the specific translation process on each said original term based on the identified type of annotation; and outputting in a predetermined manner each translated original term executed by the translation process to at least one of a computer-readable storage medium, a display screen, and a printer, wherein an original term that does not match a proper noun is translated to include a target language translation of the original term.

12. The storage medium according to claim 11, wherein the translation process has a process for outputting each said original term in an original language and a process for outputting each said original term in a target language translation of each said original term at a predetermined location relative to each said original term.

13. The storage medium according to claim 11, further comprising:
   determining whether related information related to the original term is available; and
   outputting the translated term appended with the related information depending on the type of annotation identified.

14. The storage medium according to claim 11, wherein the different types of annotation include at least two annotations selected from the group of highlight, underline, moving border, leading line and note.

15. The storage medium according to claim 11, wherein an original term that does match a proper noun and has a corresponding first type annotation is translated by a first specific translation process that outputs each original term in an original language and outputs a target language translation of each said original term at a predetermined location relative to each said original term, and an original term that does match a proper noun and has a corresponding second, different type annotation is translated by a second specific translation process that outputs a target language translation of each said original term appended with related information related to each said original term.

* * * * *